United States Patent
Wang et al.

(10) Patent No.: US 7,970,564 B2
(45) Date of Patent: Jun. 28, 2011

(54) ENHANCEMENT TECHNIQUES FOR BLIND SOURCE SEPARATION (BSS)

(75) Inventors: Song Wang, San Diego, CA (US); Eddie L. T. Choy, Carlsbad, CA (US); Samir Kumar Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1020 days.

(21) Appl. No.: 11/551,509

(22) Filed: Oct. 20, 2006

(65) Prior Publication Data

US 2007/0257840 A1     Nov. 8, 2007

Related U.S. Application Data

(60) Provisional application No. 60/797,264, filed on May 2, 2006.

(51) Int. Cl.
    *G01R 13/00*        (2006.01)

(52) U.S. Cl. ............... 702/66; 702/70; 702/74; 702/189; 702/190; 702/191; 702/192; 702/193; 702/194; 702/195; 704/200; 704/226; 704/228; 704/233

(58) Field of Classification Search ............... 702/66, 702/70, 74, 189–195; 704/200, 226, 228, 704/233

See application file for complete search history.

(56) References Cited

U.S. PATENT DOCUMENTS

| | | | |
|---|---|---|---|
| 5,539,832 A * | 7/1996 | Weinstein et al. | 381/94.1 |
| 5,825,671 A * | 10/1998 | Deville | 702/191 |
| 6,526,148 B1 * | 2/2003 | Jourjine et al. | 381/94.7 |
| 7,020,294 B2 | 3/2006 | Lee et al. | |
| 7,464,029 B2 | 12/2008 | Visser et al. | |
| 2002/0172374 A1 * | 11/2002 | Bizjak | 381/71.14 |
| 2003/0061185 A1 * | 3/2003 | Lee et al. | 706/20 |
| 2003/0179888 A1 | 9/2003 | Burnett et al. | |
| 2006/0053002 A1 * | 3/2006 | Visser et al. | 704/200 |
| 2006/0080089 A1 | 4/2006 | Vierthaler et al. | |

(Continued)

FOREIGN PATENT DOCUMENTS

EP        0729288        8/1996

(Continued)

OTHER PUBLICATIONS

Jafari et al, "Adaptive noise cancellation and blind source separation", 4th International Symposium on Independent Component Analysis and Blind Signal Separation (ICA2003), pp. 627-632, Apr. 2003.*

(Continued)

*Primary Examiner* — Jonathan C Teixeira Moffat
*Assistant Examiner* — Hyun Park
(74) *Attorney, Agent, or Firm* — Todd Marlette; Espartaco Diaz Hidalgo (57) ABSTRACT

This disclosure describes signal processing techniques that can improve the performance of blind source separation (BSS) techniques. In particular, the described techniques propose pre-processing steps that can help to de-correlate the different signals from one another prior to execution of the BSS techniques. In addition, the described techniques also propose optional post-processing steps that can further de-correlate the different signals following execution of the BSS techniques. The techniques may be particularly useful for improving BSS performance with highly correlated audio signals, e.g., from two microphones that are in close spatial proximity to one another.

33 Claims, 4 Drawing Sheets

U.S. PATENT DOCUMENTS

2007/0257840 A1 11/2007 Wang et al.

FOREIGN PATENT DOCUMENTS

| WO | 9711538 | 3/1997 |
|---|---|---|
| WO | 0195666 | 12/2001 |
| WO | WO2004008804 | 1/2004 |

OTHER PUBLICATIONS

Mukai et al, "Removal of residual cross-talk component in blind source separation using time-delayed spectral subtraction", pp. 1789-1792, Proc of ICASSP 2002.*

Mukai et al, "Removal of residual cross-talk component in blind source separation using LMS filters", pp. 435-444, IEEE 2002.*

Lee et al., "Combining time-delayed decorrelation and ICA: Towards solving the cocktail party problem," IEEE (1998).*

Mukai et al, "Removal of residual cross-talk component in blind source separation using LMS filters", pp. 435-444, IEEE 200.*

Karvanen et al., ("Temporal decorrelation as pre-processing for linear and post-nonliner ICA") (2004).*

Caihua Zhao et al: "An effective method on blind speech separation in strong noisy environment" VLSI design and video technology, 2005, Proceedings of 2005 IEEE International Workshop on Suzhou, China May 28-30, 2005 Piscataway, NJ USA, IEEE May 28, 2005 pp. 211-214.

Curces S. et al: "Blind separation of convolutive mixtures: a Gauss-Newton algorithm" Higher-order statistics, 1997., Proceedings of the IEEE Signal Processing Workshop on Banff, Alta., Canada Jul. 21-23, 1997, Los Alamitos, CA IEEE Comput. Soc. US Jul. 21, 1997 pp. 326-330.

Figueroa M, et al: "Adaptive Signal Processing in Mixed-Signal VLSI with Anti-Hebbian Learning" Emerging VLSI technologies and architectures, 2006. IEEE Computer Society Annual Symposium on Klarlshuhe, Germany Mar. 2-3, 2006 pp. 133-140.

Leong W Y et al: "Blind Multiuser Receiver in Rayleigh Fading Channel" Communications Theory Workshop, 2005. Proceedings, 6th Australian Brisbane AUS Feb. 2-4, 2005, Piscataway NJ, IEEE, Feb. 2, 2005 pp. 155-161.

Potter M. et al: "Competing ICA techniques in biomedical signal analysis" Electrical and Comptuer Engineering, 2001. Canadian conference on May 13-16, 2001 Piscataway, NJ, IEEE May 13, 2001 pp. 987-992.

Siow Yong Low et al: "Spatio-temporal processing for distant speech recognition" Acoustics, speech and signal processing, 2004. Proceedings (ICASSP pr) IEEE International Conference on Montreal, Quebec, Canada May 17-21, 2004, Piscataway, NJ, US IEEE, vol. 1, May 17, 2004 pp. 1001-1004.

Vrins F. et al: "Improving independent component analysis performances by variable selection" Neural networks for signal processing, 2003. NNSP'03. 2003 IEEE 13th Workshop on Toulouse, France Sep. 17-19, 2003 Piscataway, NJ, IEEE Sep. 17, 2003 pp. 359-368.

Ran Lee et al: "Methods for the blind signal separation problem" Neural Networks and Signal Processing, 2003. Proceedings of the 2003 International Conference on Nanjing, China Dec. 14-17, 2003, Piscataway, NJ US IEEE vol. 2, Dec. 14, 2003 pp. 1386-1389.

International Search Report, PCT/US2007/067044, International Search Authority European Patent Office, Sep. 3, 2007.

Amari et al. "A New learning algorithm for blind signal separation." In D. Touretzky, M. Mozer, and M. Hasselmo (Eds.) Advances in Neural Information Processing Systems 8 (pp. 757-763). Cambridge: MIT Press 1996.

Anand, K. et al.: "Blind Separation of Multiple Co-Channel BPSK Signals Arriving at an Antenna Array," IEEE Signal Processing Letters 2 (9), pp. 176-178.

Barrere J., et al., "A Compact Sensor Array for Blind Separation of Sources," IEEE Transactions on Circuits and Systems-I: Fundamental Theory and Applications, 2002, 49 (5), 565-574.

Bell, A. et al.: "An Information-Maximization Approach to Blind Separation and Blind Deconvolution," Howard Hughes Medical Institute, Computational Neurobiology Laboratory, The Salk Institute, 10010 N. Torrey Pines Road, La Jolla, CA 92037 USA and Department of Biology, University of California, San Diego, La Jolla, CA 92093 USA.pp. 1129-1159.

Belouchrani A., et al., "Blind Source Separation Based on Time-Frequency Signal Representations," IEEE Transactions on Signal Processing, 1998, 46 (11), 2888-2897.

Benesty, J. et al.: "Advances in Network and Acoustic Echo Cancellation," pp. 153-154, Springer, New York, 2001.

Boll, S.: "Suppression of Acoustic Noise in Speech Using Spectral Subtraction," IEEE Transactions on Acoustics, Speech, and Signal Processing, vol. ASSP-27, No. 2, Apr. 1979. pp. 113-120.

Breining, C. et al.: "Acoustic Echo Control An Application of Very-High-Order Adaptive Filters," IEEE Signal Processing Magazine 16 (4), pp. 42-69.

Cardoso, J.F.: "Blind Signal Separation: Statistical Principles," ENST/CNRS 75634 Paris Cedex 13, France, Proceedings of the IEEE, vol. 86, No. 10, Oct. 1998.

Cardoso, J.F.: "Source Separation Using Higher Order Moments," Ecole Nat. Sup. Des Telecommunications—Dept SIGNAL 46 rue Barrault, 75634 Paris Cedex 13, France and CNRS-URS 820, GRECO-TDSI, ICASSP, IEEE International Conference on Acoustics, Speech and Signal Processing—Proceedings 4, pp. 2109-2112.

Cardoso, J.F.: "The Invariant Approach to Source Separation," ENST/CNRS/GdR TdSI 46 Rue Barrault, 75634 Paris, France, 1995 International Symposium on Nonlinear Theory and Its Applications (NOLTA '95) Las Vegas, U.S.A., Dec. 10-14, 1995.

Chen, J. et al.: "Speech Detection Using Microphone Array," Electronics Letters Jan. 20, 2000 vol. 36 No. 2, pp. 181-182.

Cho, Y. et al.: "Improved Voice Activity Detection Based on a Smoothed Statistical Likelihood Ratio," Centre for Communication Systems Research, University of Surrey, Guildford, Surrey GU2 7XH, UK, ICASSP, IEEE International Conference on Acoustics, Speech and Signal Processing—Proceedings 2, pp. 737-740.

Choi, S. et al.: "Blind Source Separation and Independent Component Analysis: A Review," Neural Information Processing—Letters and Reviews, vol. 6, No. 1 Jan. 2005.

Comon, P.: "Independent Component Analysis, A New Concept?," Thomson-Sintra, Parc Sophia Antipolis, BP 138, F-06561 Valbonne Cedex, France, Signal Processing 36 (1994) 287-314.

deLathauwer, L. et al.: "Fetal Electrocardiogram Extraction by Source Subspace Separation," Proceedings, IEEE SP/Athos Workshop on Higher-Order Statistics, Jun. 12-14, 1995 Girona, Spain, pp. 134-138. Aug. 1994.

Doukas, N. et al.: "Voice Activity Detection Using Source Separation Techniques," Signal Processing Section, Dept of Electrical Engineering, Imperial College, UK, 1997.

Eatwell, G.: "Single-Channel Speech Enhancement" in Noise Reduction in Speech Applications, Davis, G. pp. 155-178, CRC Press, 2002.

Ehlers, F. et al.: "Blind Separation of Convolutive Mixtures and an Application in Automatic Speech Recognition in a Noisy Environment," IEEE Transactions on Signal Processing, vol. 45, No. 10, Oct. 1997. pp. 2608-2612.

ETSI EN 301 708 v 7.1.1; "Digital Cellular Telecommunications System (Phase2+); Voice Activity Detector (VAD) for Adaptive Multi-Rate (AMR) Speech Traffic Channels," GSM 06.94 version 7.1.1 Release 1998.

Gabrea, M. et al.: "Two Microphones Speech Enhancement System Based on a Double Fast Recursive Least Squares (DFRLS) Algorithm," Equipe Signal et Image, ENSERB and GDR-134, CNRS, BP 99, 33 402 Talence, France, LASSY-I3S Nice, France, Texas-Instruments, Villenueve-Loubet, France,1993, pp. 544-547.

Girolami, M.: "Noise Reduction and Speech Enhancement via Temporal Anti-Hebbian Learning," Department of Computing and Information Systems, The University of Paisley, Paisley, PA1 2BE, Scotland.

Girolami, M.: "Symmetric Adaptive Maximum Likelihood Estimation for Noise Cancellation and Signal Separation," Electronics Letters 33 (17), pp. 1437-1438, 1997.

Guerin, A.: "A Two-Sensor Voice Activity Detection and Speech Enhancement based on Coherence with Additional Enhancement of Low Frequencies using Pitch Information," LTSI, Universite de Rennes 1, Bat 22, 7eme etage, campus de Beaulieu, 35042 Rennes Cedex, France.

Gupta, S. et al.: "Multiple Microphone Voice Activity Detector," U.S. Appl. No. 11/864,897, filed Sep. 28, 2007.

Haigh, J.A. et al.: "Robust Voice Activity Detection using Cepstral Features," Speech Research Group, Electrical Engineering Department, University College Swansea, SWANSEA, SA2 8PP, UK. p. 321-324.

Hansler, E.: "Adaptive Echo Compensation Applied to the Hands-Free Telephone Problem," Institut fur Netzwerk-und Signaltheorie, Technische Hochschule Darmstadt, Merckstrasse 25, D-6100 Darmstadt, FRG,Proceedings—IEEE International Symposium on Circuits and Systems 1, pp. 279-282, 1990.

Heitkamper, P. et al.: "Adaptive Gain Control for Speech Quality Improvement and Echo Suppression," Proceedings—IEEE International Symposium on Circuits and Systems 1, pp. 455-458, 1993.

Hoyt, J. et al.: "Detection of Human Speech in Structured Noise," Dissertation Abstracts International, B: Sciences and Engineering 56 (1), pp. 342-B-343-B, 1995.

International Search Report, PCT/US2008/077994, European Patent Office.

Junqua, J.C. et al.: "A Study of Endpoint Detection Algorithms in Adverse Conditions: Incidence on a DTW and HMM Recognize," in Proc. Eurospeech 91, pp. 1371-1374, 1991.

Jutten, C. et al.: "Blind Separation of Sources, Part I: An Adaptive Algorithm based on Neuromimetic Architecture," INPG-Lab, TIRF, 46, Avenue Felix Viallet, F-38031 Grenoble Cedex, France, Signal Processing 24 (1991) 1-10.

Jutten, C. et al.: "Independent Component Analysis versus Principal Components Analysis," Signal Processing IV: Theo, and Appl. Elsevier Publishers, pp. 643-646, 1988.

Le Bouquin-Jeannes R et al: "Study of a voice activity detector and its influence on a noise reduction system", Speech Communication, Elseview Science Publishers, Amsterdam, NL, vol. 16, No. 3, Apr. 1, 1995, pp. 245-254.

Makeig, S. et al.: "Independent Component Analysis of Electroencephalographic Data," Proceedings of the Advances in Neural Information Processing Systems 8, MIT Press, 1995.

Molgedey et al., "Separation of a mixture of independent signals using time delayed correlations," Physical Review Letters, The American Physical Society, 72(23):3634-3637. 1994.

Nguyen, L. et al.: "Blind Source Separation for Convolutive Mixtures, Signal Processing," Signal Processing, 45(2):209-229, 1995.

Parra, L. et al.: "Convolutive Blind Separation of Non-Stationary Sources," IEEE Transitions on Speech and Audio Processing, vol. 8, No. 3, May 2000. p. 320-327.

Rosca, J. et al.: "Multichannel Voice Detection in Adverse Environments," In Proc. EUSIPCO 2002, France, Sep. 2002.

Sattar, F. et al.: "Blind Source Separation of Audio Signals Using Improved ICA Method," School of EEE, Nanyang Technological University, Nanyang Avenue, Singapore 639798, IEEE Workshop on Statistical Signal Processing Proceedings, pp. 452-455.

Smaragdis: "Efficient Blind Separation of Convolved Sound Mixtures," Machine Listening Group, MIT Media Lab, Rm. E15-401C, 20 Ames St., Cambridge, MA 02139, 1997.

Srinivasant, K. et al.: "Voice Activity Detection for Cellular Networks," Center for Information Processing Research Dept. of Electrical and Computer Engineering, University of California Santa Barbara. p. 85-86.

Tahernezhadi, M. et al.: "Acoustic Echo Cancellation Using Subband Technique for Teleconferencing Applications," Department of Electrical Engineering Northern Illinois University DeKalb, IL 60115. p. 243-247.

Tong, L. et al.: "Indeterminacy and Identifiability of Blind Identification," IEEE transactions on circuits and systems 38 (5), pp. 499-509, 1991.

Torkkola, K.: "Blind Separation of Convolved Sources Based on Information Maximization," Motorola, Inc., Phoenix Corporate Research Laboratories, 2100 E. Elliot Rd. MD EL508, Tempe AZ 85284, USA, Proceedings of the International Joint Conference on Neura. p. 423-432.

Tucker, R.: "Voice Activity Detection Using a Periodicity Measure," IEE Proceedings, Part I: Communications, Speech and Vision 139 (4),Aug. 1992, pp. 377-380.

Wang, S. et al.: "Apparatus and Method of Noise and Echo Reduction in Multiple Microphone Audio Systems," U.S. Appl. No. 11/864,906, filed Sep. 28, 2007.

Widrow, B. et al.: "Adaptive Noise Cancelling: Principles and Applications," Proceedings of the IEEE 63 (12), pp. 1692-1716, 1975.

Wouters, J. et al.: "Speech Intelligibility in Noise Environments with One- and Two-Microphone Hearing Aids," University of Leuven/K. U.Leuven, Lab. Exp. ORL, Kapucijnenvoer 33, B-3000 Leuven, Belgium, Audiology 38 (2), pp. 91-98, 1999.

Written Opinion of the International Searching Authority, PCT/US2008/077994.

Xi, J. et al.: "Blind Separation and Restoration of Signals Mixed in Convolutive Environment," The Communications Research Laboratory, McMaster University Hamilton, Ontario, Canada L8S 4K1, ICASSP, IEEE International Conference on Acoustics, pp. 1327-1330.

Yasukawa, H. et al.: "An Acoustic Echo Canceller Using Subband Sampling and Decorrelation Methods," IEEE Transactions on Signal Processing, vol. 41, No. 2, Feb. 1993, pp. 926-930.

Yellin, D. et al.: "Criteria for Multichannel Signal Separation," IEEE Transactions on Signal Processing, vol. 42, No. 8, Aug. 1994,pp. 2157-2168.

Zou, Q. et al.: "A Robust Speech Detection Algorithm in a Microphone Array Teleconferencing System," School of Electrical and Electronics Engineering, Nanyang Avenue, Nanyang Technological University, Singapore 639798, in Proc. ICASSP 2001, pp. 3025-3028.

* cited by examiner

ENHANCEMENT TECHNIQUES FOR BLIND SOURCE SEPARATION (BSS)

This application claims the benefit of U.S. Provisional Application No. 60/797,264, filed May 2, 2006, the entire content of which is incorporated herein by reference.

TECHNICAL FIELD

This disclosure relates to signal processing and, more particularly, processing techniques used in conjunction with blind source separation (BSS) techniques.

BACKGROUND

In many signal processing applications, different signals are often corrupted with noise. This noise may include such things as background sounds, disturbances, interference, cross-talk, or any unwanted addition to a recorded signal. Accordingly, in order to enhance the signals, it is desirable to reduce or eliminate this noise. In speech communication processing, signal processing for noise reduction is often called speech enhancement.

Blind source separation (BSS) can be used to restore independent source signals using multiple independent signal mixtures of the source signals. In order to separate two signals, two or more sensors are needed to generate independent signal mixtures. Each sensor is placed at a different location, and each sensor records a signal, which is a mixture of the source signals. The recorded signals are independent from one another, however, because the sensors record the information at different locations. BSS algorithms may be used to separate signals by exploiting these signal differences, which manifest the spatial diversity of the common information that was recorded by both sensors. In speech communication processing, the different sensors may comprise microphones that are placed at different locations relative to the source of the speech that is being recorded.

SUMMARY

This disclosure describes signal processing techniques that can improve the performance of blind source separation (BSS) techniques. In particular, the described techniques include pre-processing steps that can help to de-correlate independent sensor signals from one another prior to execution of the BSS techniques. In addition, the described techniques also may include optional post-processing steps that can further de-correlate the different signals following execution of the BSS techniques. The techniques may be particularly useful for improving BSS performance with highly correlated audio signals, e.g., audio signals recorded by two microphones that are in close spatial proximity to one another.

In one embodiment, this disclosure describes a method comprising receiving a first signal associated with a first sensor and a second signal associated with a second sensor, pre-processing the second signal to de-correlate the second signal from the first signal, applying a BSS technique to the first signal to generate a first BSS signal, and applying the BSS technique to the pre-processed second signal to generate a second BSS signal.

In another embodiment, this disclosure describes a device comprising a first sensor that generates a first signal and a second sensor that generates a second signal, a pre-processing unit that pre-processes the second signal to de-correlate the second signal from the first signal, and a BSS unit that applies a BSS technique to the first signal and the pre-processed second signal to generate first and second BSS signals respectively. Optionally, the device may also include a post-processing unit to further de-correlate the BSS signals.

In another embodiment, this disclosure describes an apparatus comprising means for generating a first signal, means for generating a second signal, means for pre-processing the second signal to de-correlate the second signal from the first signal, and means for applying a BSS technique to the first signal and the pre-processed second signal to generate first and second BSS signals respectively. Optionally, means for post-processing the BSS signals may also be applied to one or both of the BSS signals to further de-correlate the BSS signals.

These and other techniques described in this disclosure may be implemented in hardware, software, firmware, or any combination thereof. If implemented in software, the software may be executed in a digital signal processor (DSP) or other type of processor. The software that executes the techniques may be initially stored in a machine-readable medium and loaded and executed in the processor for effective enhancement of BSS techniques.

Accordingly, this disclosure also contemplates a machine-readable medium comprising instructions that upon execution receive a first signal and a second signal, pre-process the second signal to de-correlate the second signal from the first signal, and apply a BSS technique to the first signal and the pre-processed second signal to generate first and second BSS signals respectively.

Additional details of various embodiments are set forth in the accompanying drawings and the description below. Other features, objects and advantages will become apparent from the description and drawings, and from the claims.

DETAILED DESCRIPTION

This disclosure describes signal processing techniques that can improve the performance of blind source separation (BSS) techniques. In particular, the described techniques include pre-processing steps that can help to de-correlate independent sensor signals from one another prior to execution of the otherwise regular BSS techniques. In addition, the described techniques may also include optional post-processing steps that can further de-correlate the separated signals following execution of the BSS techniques. The techniques described herein may be particularly useful for improving the performance of BSS algorithms performance with highly correlated audio signals, e.g., audio signals recorded by two microphones that are in close spatial proximity to one another.

Some BSS algorithms may have limited effectiveness, particularly when two sensors are positioned very close to one another. For handheld devices that perform speech enhancement, for example, it may be desirable to have a microphone arrangement in which the different microphones are positioned in close spatial proximity to one another. Indeed, handheld devices, including wireless communication devices such as mobile telephones, are commonly designed with small form factors in order to promote user convenience, which presents challenges for BSS due to the close spatial proximity of different microphones.

In general, BSS is used to separate independent signals using multiple mixtures of these signals. In the techniques described in this disclosure, improvements are described for use with otherwise regular BSS algorithms. The described techniques may use an adaptive filter to de-correlate recorded signals as part of a pre-processing procedure. Then, the de-correlated signals can be calibrated as part of the pre-processing. After calibration, a BSS feedback architecture based on information maximization may be used to separate the de-correlated signals. Optionally, a second adaptive filter may be used as part of a post-processing procedure to further improve signal separation performance by further de-correlating the signals.

Figure 1:
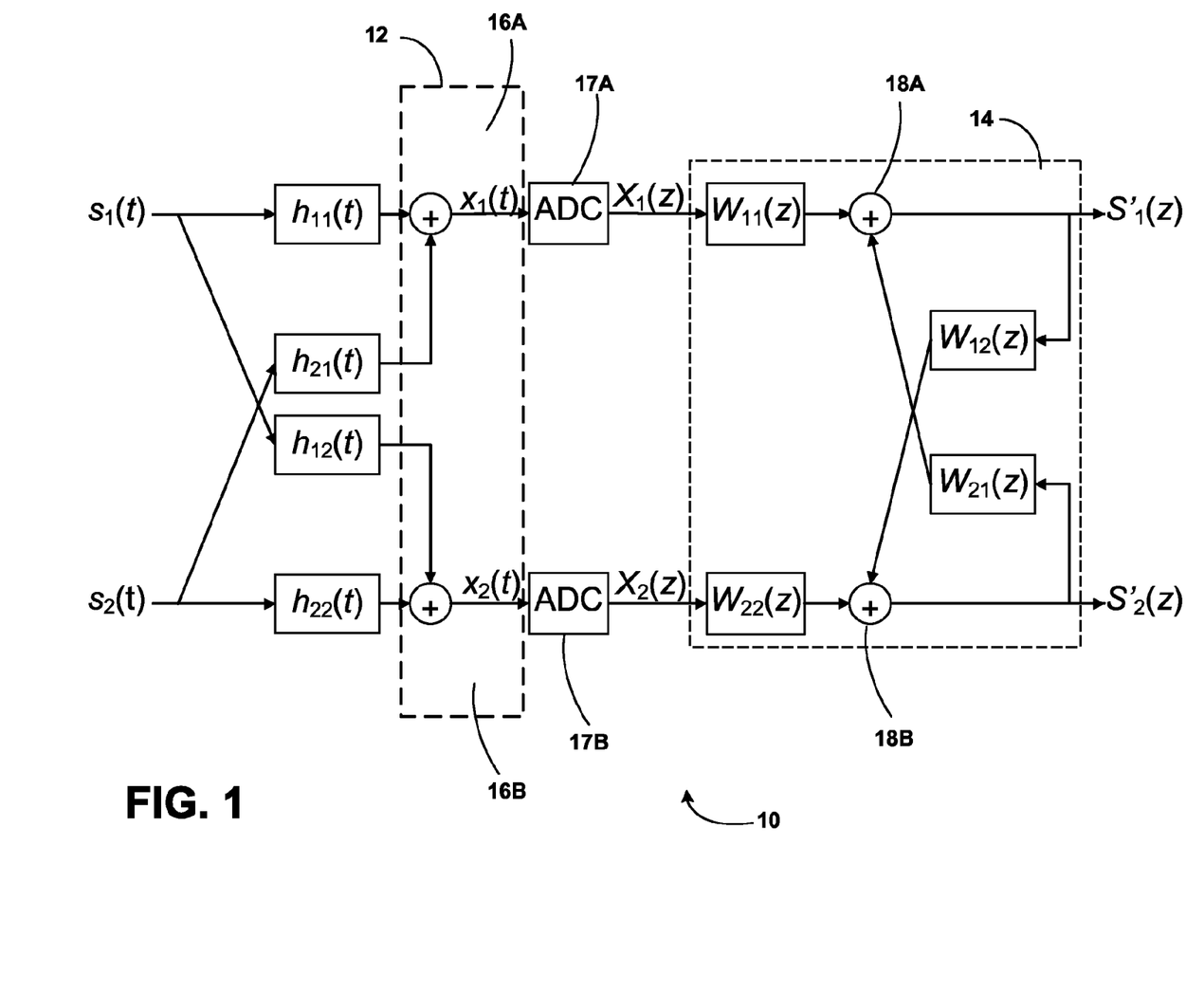
FIG. 1 is a block diagram of a device that performs a blind source separation (BSS) technique that may be enhanced by the pre-processing and post-processing techniques described herein.

FIG. 1 is a block diagram of a device 10 that performs a BSS technique that may be enhanced by the pre-processing and post-processing techniques described in this disclosure. BSS is also known as independent component analysis (ICA), and can be used to separate signals based on multiple mixtures of these signals. During the separation process, a number of recorded sensor signals, which are mixtures of source signals, are available. Typically, information regarding the mixing process is not available, and no direct measurements of source signals is available. Sometimes, a priori statistical information of some or all source signals may be available.

BSS has attracted broad attention from researchers due to its potential value in many signal processing problems. BSS has potential applications in various areas, such as communications, speech enhancement, noise reduction, and biomedical signal processing including electrocardiogram (ECG) and electroencephalogram (EEG) processing, and the like. The techniques described herein may be particularly useful for speech applications in wireless communication devices where small form factors limit microphone placement. However, the techniques are not limited to speech applications and may be useful in other signal processing applications, or other devices.

Among a number of BSS approaches, an information maximization based method is of much interest because of its simplicity and its suitability for real-time implementation on fixed-point platforms. Such BSS approaches may be used for separating convolutive signal mixtures. In particular, feedback cross-filters can be used to separate convolutively mixed signals.

As shown in FIG. 1, device 10 includes a sensor unit 12 and a BSS unit 14. The variables $S_1(t)$ and $S_2(t)$ represent two independent source signals. Filter $h_{11}(t)$, $h_{12}(t)$, $h_{21}(t)$, $h_{22}(t)$ represent convolutive paths between the sensors and the sources. Sensors 16A and 16B are illustrated as adders, but more generally represent two different sensors, such as microphones, located at different locations. If used in speech enhancement, it may be desirable for sensors 16A and 16B to comprise omni-directional microphones, as these are cost effective.

Signal $S_1(t)$ convolves with path $h_{11}(t)$ before it reaches sensor 16A and convolves with path $h_{12}(t)$ before it reaches sensor 16B. Similarly, signal $S_2(t)$ convolves with path $h_{21}(t)$ before it reaches sensor 16A and convolves with path $h_{22}(t)$ before it reaches sensor 16B. Sensors 16A and 16B capture the respective information to generate signals $x_1(t)$ and $x_2(t)$, respectively. Then, ADCs 17A and 17B generate signals $X_1(z)$ and $X_2(z)$, respectively. Thus, signals $X_1(z)$ and $X_2(z)$ are in digital domain after analog-to-digital conversion. These signals $X_1(z)$ and $X_2(z)$ are fed to BSS unit 14 in order to perform the blind source separation.

In particular, BSS unit 14 implements a feedback cross filtering technique. $X_1(z)$ is fed into a filter having transfer function $W_{11}(z)$ and then to adder 18A. $X_2(z)$ is similarly fed into a filter having transfer function $W_{22}(z)$ and then to adder 18B. The output of adder 18A is fed into another filter having transfer function $W_{12}(z)$ before being fed back to adder 18B. The output of adder 18B is fed into another filter having transfer function $W_{21}(z)$ before being fed back to adder 18B. In FIG. 1, the variables $S'_1(z)$ and $S'_2(z)$ represent the outputs of BSS unit 14 which typically resemble source signal $S_1(t)$ and $S_2(t)$ and have much better separation than input signals $X_1(z)$ and $X_2(z)$ to BSS unit 14.

The filters represented by transfer functions $W_{12}(z)$ and $W_{21}(z)$ can be implemented using least mean square (LMS) like adaptive filtering algorithm. Additional details of such filtering is discussed in greater detail below in the discussion of FIG. 2. If desired, non-linear transfer functions denoted as $\Psi(\bullet)$ (not shown in FIG. 1) can be used during filter coefficient update. Possible forms of the function $\Psi(\bullet)$ include $\Psi(x)=\tanh(x)$, $\Psi(x)=|x|$, and $\Psi(x)=2P_x(x)-1$, where $P_x(x)$ is the cumulative distribution function (cdf) of random variable X. The functions denoted as $\Psi(\bullet)$ are not shown in FIG. 1, however, for simplicity.

The transfer functions $W_{11}(z)$ and $W_{22}(z)$ may take several forms consistent with BSS techniques. However, for added simplicity, in the following discussion, $W_{11}(z)$ and $W_{22}(z)$ can be replaced by scalars without compromising the performance of the algorithm. Accordingly, in the following discussion, these two transfer functions are set to be unity and removed from subsequent figures.

A BSS algorithm like that implemented by BSS unit 14 is very simple to implement and yields fairly good separation performance in many cases. However, such an algorithm may have difficulty in converging when recordings are highly correlated. When this happens, the BSS algorithm may tend to annihilate the most prominent component in all signals. In speech enhancement, the most prominent component is most likely the desired speech signal. For this reason, this disclosure implements a pre-processing unit to address these potential problems.

In some cases, the BSS algorithm like that implemented by BSS unit 14 does not fully exploit available information to separate the signals. In this case, correlation between the separated signals may still be observed following separation by BSS unit 14. This leaves room for further improvement on the performance of the algorithm. For this reason, this disclosure may also implement a post-processing unit is provide further de-correlation. The improved BSS techniques described below may be especially useful for applications where only one source signal is interested, like in the case of multi-microphone noise reduction in speech communication.

Generally, in BSS algorithms, all signals are treated as independent random variables. The assumption used to blindly separate signals is that all random variables are statistically independent to each other, i.e., the joint distribution of all random variables is the product of all individual random variables. This assumption can be formulated as:

$$P_{S_1,\ldots S_m}(s_1,\ldots s_m) = P_{S_1}(s_1)\ldots P_{S_m}(s_m),$$

where $P_{S_1, \ldots S_m}(s_1, \ldots s_m)$ is joint distribution of all random variables $S_1, \ldots, S_m$ and $P_{S_j}(s_j)$ is the distribution of the jth random variable $S_j$.

The BSS problem may be called an instantaneous BSS problem if the mixing process can be modeled as instantaneous matrix mixing, which is formulated as:

$$\bar{x}(t) = A\bar{s}(t),$$

where $\bar{s}(t)$ is an m×1 vector, $\bar{x}(t)$ is an n×1 vector, A is an n×m scalar matrix. In the separation process, an m×n scalar matrix B is calculated and used to reconstruct signal $\hat{s}(t)=B\bar{x}(t)=BA\bar{s}(t)$ such that $\hat{s}(t)$ resembles $\bar{s}(t)$ up to arbitrary permutation and arbitrary scaling. In other words, matrix BA can be decomposed to PD, where matrix P is a permutation matrix and matrix D is a diagonal matrix. A permutation matrix is a matrix derived by permuting an identity matrix of the same dimension. A diagonal matrix is a matrix that only has non-zero entries on its diagonal. Note that the diagonal matrix D does not have to be an identity matrix. If all m sources are independent from one another, there should not be zero entry on diagonal of matrix D. In general, n≥m is required for complete signal separation.

Unfortunately, in reality, few problems can be modeled using instantaneous mixing. Signals typically travel through non-ideal channels before being recorded by sensors, as illustrated in FIG. 1. In this case, the problem is considered as convolutive BSS problem. Its mixing process can be modeled as:

$$x_i(t) = \sum_{j=1}^{m} h_{ij}(t) \otimes s_j(t) \quad i = 1, \ldots, n.$$

Here, $s_j(t)$ is the jth source and $x_i(t)$ is the measurement by the ith sensor. Transfer function $h_{ij}(t)$ is the transfer function between the jth source and the ith sensor. Symbol $\otimes$ denotes convolution. Another set of filters $W_{ji}(z)$ is needed to restore source signals $\bar{s}(t)$.

The restoration formula is:

$$S'_j(z) = \sum_{i=1}^{n} W_{ji}(z) X_i(z) \quad j = 1, \ldots, m.$$

Here, Z-domain representation is used because the separation process is executed in digital signal domain. Similar to the instantaneous mixing problem, S'(z) resembles $\bar{S}(z)$, which is a discrete representation of source signals $\bar{s}(t)$, up to an arbitrary permutation and an arbitrary convolution. If mixing transfer functions $h_{ij}(t)$ are expressed using discrete representation $H_{ij}(t)$, the overall system can be formulated as:

$$W(z)H(z) = PD(z),$$

where $$H(z) = \begin{bmatrix} H_{11}(z) & H_{21}(z) \\ H_{12}(z) & H_{22}(z) \end{bmatrix},$$

$$W(z) = \frac{1}{1 - W_{12}(z)W_{21}(z)} \begin{bmatrix} 1 & -W_{21}(z) \\ -W_{12}(z) & 1 \end{bmatrix}.$$

P is a permutation matrix and D(z) is a diagonal transfer function matrix. The elements on the diagonal of D(z) are transfer functions rather than scalars as represented in the instantaneous BSS problems. Meanwhile, the requirement for complete separation in instantaneous BSS, m≥n, still holds in convolutive BSS.

In accordance with this disclosure, it may be assumed that two sensors are used. Of all source signals, only one signal is considered interesting and needs to be enhanced. Nevertheless, although a focus is given to two-sensor configurations, the result can be easily extended to multiple-sensor configurations and multiple interested signals.

Referring again to FIG. 1, the output of the algorithm implemented by BSS unit 14 can be formulated as:

$$S'_1(z) = W_{11}(z)X_1(z) + W_{21}(z)S'_2(z)$$

$$S'_2(z) = W_{22}(z)X_2(z) + W_{12}(z)S'_1(z).$$

As noted above, because $W_{11}(z)$ and $W_{22}(z)$ do not contribute to the performance of the algorithm, they can be set to be scalars, like unity. In the following, $W_{11}(z)$ and $W_{22}(z)$ shown in FIG. 1 are set to be unity for later figures and will not appear although they could be added. In this case, the output of this algorithm implemented by BSS unit 14 can be formulated as:

$$S'_1(z) = X_1(z) + W_{21}(z)S'_2(z)$$

$$S'_2(z) = X_2(z) + W_{12}(z)S'_1(z).$$

In some cases, $W_{12}(z)$ and $W_{21}(z)$ can be adapted using least mean square (LMS) like adaptive filtering algorithm. A possible filter update equation is given below.

$$\bar{w}_{12}(t) = \bar{w}_{12}(t-1) - 2\mu\phi(s'_2(t))\bar{s}'_1(t)$$

$$\bar{w}_{21}(t) = \bar{w}_{21}(t-1) - 2\mu\phi(s'_1(t))\bar{s}'_2(t)'$$

where $\bar{w}_{12}(t)$ and $\bar{w}_{21}(t)$ are the two filters at time t. The variables $s'_1(t)$ and $s'_2(t)$ are filtered output at time t. They are also discrete representation of $S'_1(t)$ and $S'_2(t)$, respectively. The variable $\mu$ is update step size, and $\phi(\bullet)$ is a non-linear function (not shown in FIG. 1). By way of example, the transfer function represented by variable $\phi(\bullet)$ can be sigmoid function, a hyperbolic tangent function or a sign function. It can also be another monotonous function evaluated between −1 and 1. $\bar{s}'_1(t)$ and $\bar{s}'_2(t)$ are input to filter $\bar{w}_{12}(t)$ and $\bar{w}_{21}(t)$ at time t, respectively, i.e., $$\bar{s}'_1(t) = [s'_1(t-1)s'_1(t-1) \ldots s'_1(t-M)]^T$$

$$\bar{s}'_2(t) = [s'_2(t-1)s'_2(t-1) \ldots s'_2(t-M)]^{T'}$$

where M is length of the two filters.

Figure 2:
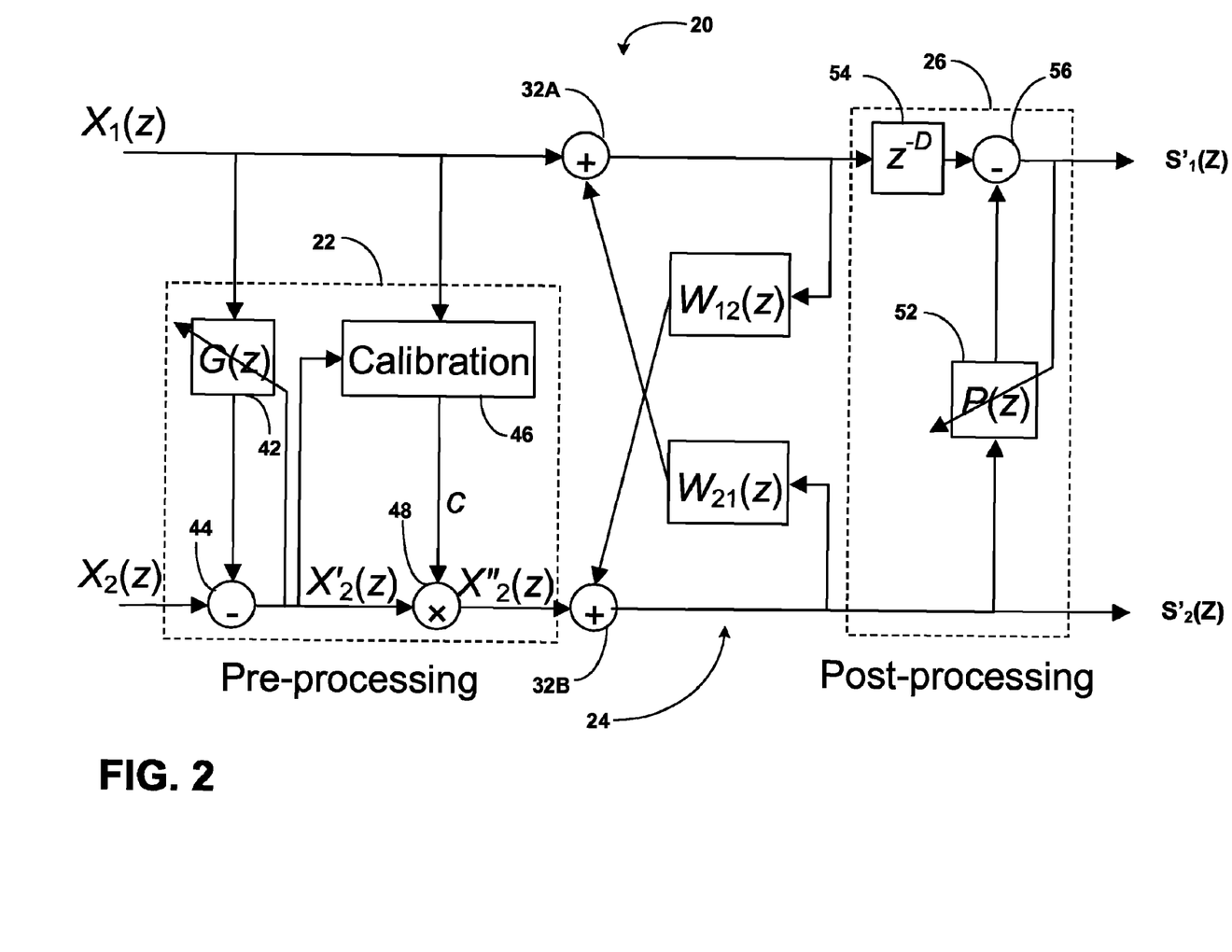
FIG. 2 is a block diagram illustrating a device that performs pre-processing and post-processing techniques relative to an otherwise regular BSS technique according to an embodiment of this disclosure.

FIG. 2 is a block diagram illustrating a device 20 that performs pre-processing and post-processing techniques relative to an otherwise regular BSS technique according to an embodiment of this disclosure. In particular, device 20 includes pre-processing unit 22, a BSS unit 24 and a post-processing unit 26. BSS unit 24 is simplified relative to BSS unit 14 in FIG. 1, but may comprise additional components consistent with any BSS technique. In any case, BSS unit 24 generally comprises components that perform an otherwise regular BSS algorithm. Pre-processing unit 22, however, modifies the BSS techniques by pre-processing the signals to improve de-correlation prior to execution of a regular BSS technique. In addition, post-processing unit 26 further modifies the algorithm to achieve additional de-correlation of the signals following the regular BSS technique. Post-processing unit 26 is optional in some embodiments.

In FIG. 2, signals $X_1(z)$ and $X_2(z)$ are signals from two different sensors, e.g., audio signals from two different microphones, such as two omni-directional microphones. First signal $X_1(z)$ is sent to adder 32A of BSS unit 24, and is also sent to pre-processing unit 22. In pre-processing unit 22, adaptive filter 42 is used to filter $X_1(z)$ and the output of adaptive filter 42 is subtracted from $X_2(z)$ via subtraction unit 44 to generate $X_2'(z)$. Adaptive filter 42 ("G(z)") may include a relatively small number of taps, e.g., three taps. $X_2'(z)$ comprises mostly noise insofar as it essentially represents the difference between $X_1(z)$ and $X_2(z)$ following filtering of $X_1(z)$. $X_2'(z)$ is also used as feedback to control adaptive filter 42.

Calibration unit 46 uses $X_2'(z)$ and $X_1(z)$ to generate a calibration factor "c." Specifically, calibration unit 46 determines the noise floor in $X_1(z)$ by dividing $X_1(z)$ into time segments and monitoring energy over a period. The minimum energy over this period is established as the noise floor of $X_1(z)$. Calibration unit 46 similarly determines the noise floor in $X_2'(z)$, e.g., by dividing $X_2'(z)$ into segments, monitoring energy over a period, and identifying a minimum energy value of $X_2'(z)$ as the noise floor. A ratio of the noise floor of $X_1(z)$ relative to that of $X_2'(z)$ establishes calibration factor "c," which can be used to scale $X_2'(z)$ so that $X_2''(z)$ has a comparable noise floor to $X_1(z)$. Multiplication unit 48 applies calibration factor "c" to $X_2'(z)$ to generate $X_2''(z)$ which is referred to herein as the pre-processed version of second signal $X_2(z)$.

Pre-possessed second signal $X_2''(z)$ is more de-correlated from $X_1(z)$ than the original first signal $X_2(z)$. For this reason, pre-processing unit 22 can improve performance of blind source separation that is performed by BSS unit 24. BSS unit 24 generally operates similar to BSS unit 14 of FIG. 1, but operates using a pre-processed second signal $X_2''(z)$ rather than signal $X_2(z)$. Filter $W_{12}(z)$ applies least mean square (LMS) adaptive filtering to first signal $X_1(z)$, and adder 32B sums the LMS adaptive filtered first signal with the pre-processed second signal $X_2''(z)$. Similarly, filter $W_{21}(z)$ applies LMS adaptive filtering to pre-processed second signal $X_2''(z)$, and adder 2A sums the LMS adaptive filtered and pre-processed second signal with the first signal $X_1(z)$.

As noted above, adaptive filter 42 does not require many taps. For many applications, one to three taps are sufficient. If three taps are used, it may be desirable to dedicate one non-causal tap to address different sensor configurations, i.e. adding one sample delay to signal $X_2(z)$. Notably, more taps may actually degrade the performance of the convolutive BSS algorithm by unnecessarily removing spatial diversity between signals. Therefore, three or fewer taps may be preferred for performance reasons.

The output of adaptive filter 42 can be denoted as $$x_2'(t) = x_2(t-\tau) - \sum_{i=1}^{N} g_t(i) x_1(t-i).$$

where $\tau$ is the delay added to signal $X_2(z)$, $g_t(i)$ is the ith filter coefficient at time t, and N is length of the adaptive filter. Adaptive filter 42 can be updated using following equation:

$$\bar{g}_{t+1} = \bar{g}_t + 2\mu x_2'(t) \bar{x}_1(t),$$

where $\bar{g}_t = [g_t(1)\ g_t(2) \ldots g_t(N)]^T$ represents the filter coefficient of adaptive filter 42 at time t, $x_2'(t)$ is filter output at time t, $\mu$ is the adaptation step size, and $\bar{x}_1(t) = [x_1(t)\ x_1(t-1) \ldots x_1(t-N+1)]^T$ is input to filter G(z).

In many cases, the output level of adaptive filter 42 is very low because the difference between signals $X_1(z)$ and $X_2(Z)$ is very small. If this signal is fed to BSS algorithm directly, the algorithm tends to converge very slowly due to unbalanced excitation on two channels. Therefore, it is desirable to calibrate this signal up to certain level to speed up BSS algorithm's convergence as described herein. In particular, the error signal can be calibrated up so that the noise level in the error signal is similar to that of a primary microphone signal. To be specific, if $L_1$ denotes the noise floor level in $X_1(z)$ and $L_2$ denotes the noise floor level in X'(z), the calibration factor c can be chosen to be $$c = L_1/L_2.$$

The outputs of BSS unit 24 are referred to herein as BSS signals. In some cases, these may comprises the final processed signals having been de-correlated from one another, in which case post-processing unit 26 can be eliminated. However, performance of the BSS algorithm may be further improved by implementing a post-processing unit 26.

Generally, after the signal separation process, two signals are generated, which again are referred to as BSS signals. The first BSS signal, which is the output of adder 32A contains primarily the interested signal and somewhat attenuated portions of all other signals. For speech enhancement applications, this first BSS signal may comprise the recorded speech with attenuated noise. The reduction of noise in the first BSS signal may vary depending on environment and properties of the speech signal and the noise. The second BSS signal, which is the output of adder 32B, contains primarily the noise, with the interested signal (such as speech detected by two different microphones) having been attenuated.

In many cases, there is still correlation between the first and second BSS signals. This correlation may be further exploited to improve the signal of interest, e.g., the speech signal. For this purpose, a post-processing unit 26 can be used to further de-correlate the first and second BSS signals.

In particular, as shown in FIG. 2, post-processing unit 26 includes an adaptive filter 52 to filters the second BSS signal, which is output from adder 32B. First BSS signal, which is output from adders 32A, is delayed via delay circuit 54. Then, the adaptively filtered second BSS signal (output from adaptive filter 52) is subtracted from the delayed first BSS signal (output from delay circuit 54) via subtraction unit 56. $S_1'(z)$ represents the output associated with input signal $X_1(z)$ following the pre-processing, BSS techniques and post-processing. Similarly, $S_2'(z)$ represents the output associated with input signal $X_2(z)$ following the pre-processing, BSS techniques and post-processing. The $S_1'(z)$ signal is also used as feedback to control adaptive filter 52.

In device 20 of FIG. 2, only one of the two signals may be desired, i.e., signal $S_1'(z)$, which may represent input signal $X_1(z)$ with unwanted noise removed. Here, the other output signal $S_2'(z)$ is simply used as input to adaptive filter 52. As noted above, following delay circuit 54, the interested signal $S_1'(z)$ is used as reference to adaptive filter 52. The adaptation of adaptive filter 52 may be similar to that of adaptive filter 42 in pre-processing unit 22. Post-processing unit 26 may be particularly useful for speech enhancement where two different microphones are used to generate one enhanced speech signal, which are typically omni-directional microphones. In this case, the enhanced speech signal may be output as $S_1'(z)$.

Figure 3:
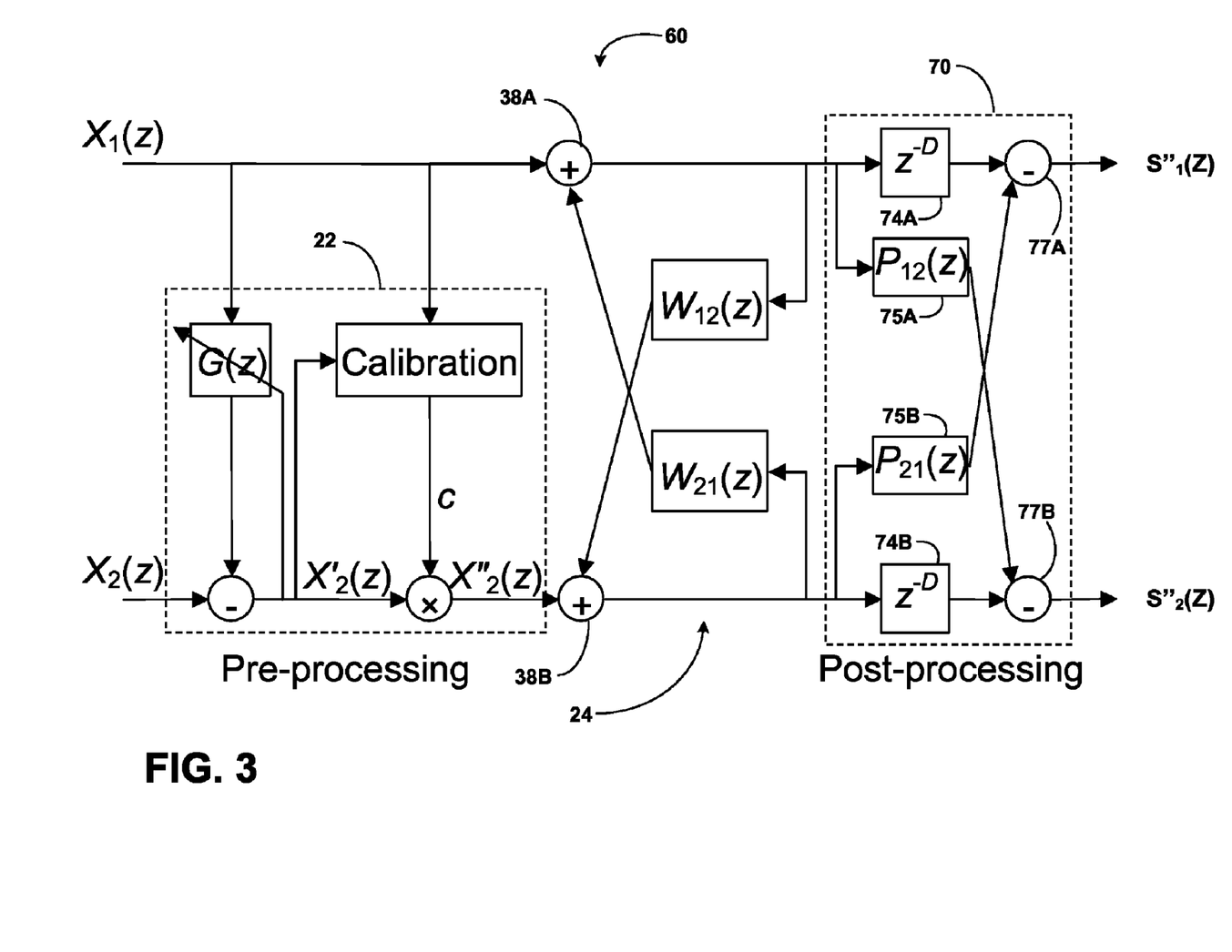
FIG. 3 is another block diagram illustrating a device that performs pre-processing and post-processing techniques relative to a BSS technique according to an embodiment of this disclosure.

FIG. 3 illustrates another embodiment of a device 60 according to an embodiment of this disclosure. Device 60 of FIG. 3 is very similar to device 20 of FIG. 2. However, in device 60, both signals ($S_1''(z)$ and $S_2''z$)) are of interest, not just signal $S_1'(z)$ as discussed above with reference to FIG. 2. Therefore, in FIG. 3, a different post processing unit 70 is used. In FIG. 3, pre-processing unit 22 and BSS unit 24 are identical to those in FIG. 2, so the description of these components is not duplicated below. Post-processing unit 70 is similar to unit 26 of FIG. 2, but essentially performs similar functions on both signal paths rather than just one of the signal paths.

In FIG. 3, post-processing unit 70 includes two adaptive filters 74A and 74B, and two delay circuits 75A and 75B. Adaptive filter 75B filters the second BSS signal, which is output from adder 32B. First BSS signal, which is output from adders 32A, is delayed via delay circuit 74A. Then, the adaptively filtered second BSS signal (output from adaptive filter 75B) is subtracted from the delayed first BSS signal (output from delay circuit 74A) via subtraction unit 77A. $S_1''(z)$ represents the output associated with input signal $X_1(z)$ following the pre-processing, BSS techniques and post-processing shown in FIG. 3. The $S_1''(z)$ signal is also used as feedback to control adaptive filter 75B, although this feedback is not illustrated for simplicity in the illustration.

The second signal path is processed similarly. In particular, adaptive filter 75A filters the first BSS signal, which is output from adder 32A. Second BSS signal, which is output from adder 32B, is delayed via delay circuit 74B. Then, the adaptively filtered first BSS signal (output from adaptive filter 75A) is subtracted from the delayed second BSS signal (output from delay circuit 74B) via subtraction unit 77B. $S_2''(z)$ represents the output associated with input signal $X_2(z)$ following the pre-processing, BSS techniques and post-processing shown in FIG. 3. The $S_2''(z)$ signal is also used as feedback to control adaptive filter 75A, although this feedback is not illustrated for simplicity in the illustration.

Figure 4:
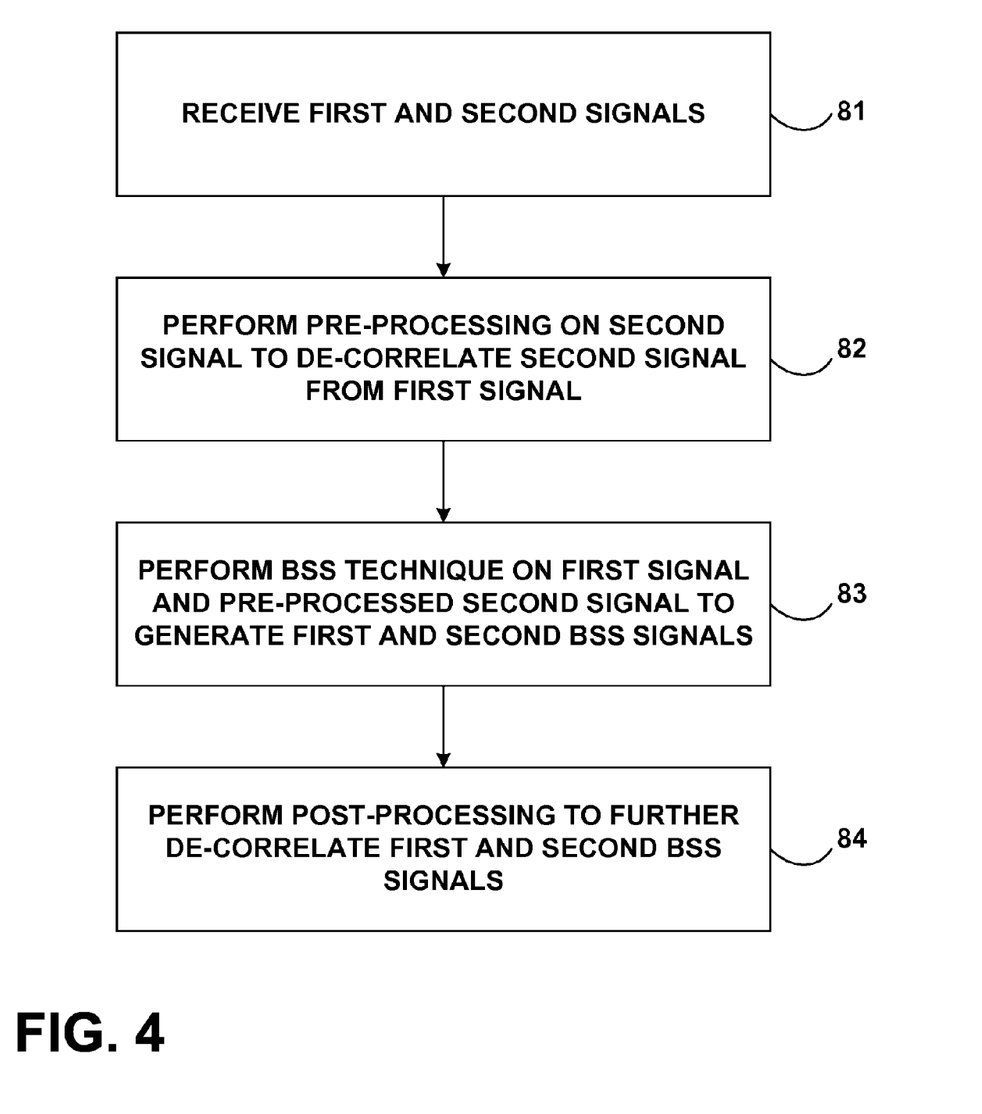
FIG. 4 is a flow diagram illustrating a technique that may be performed according to an embodiment of this disclosure.

FIG. 4 is a flow diagram illustrating a technique that may be performed according to an embodiment of this disclosure. As shown in FIG. 4, device 20 (see FIG. 2) receives first and second signals $X_1(z)$ and $X_2(z)$ (81). Signals $X_1(z)$ and $X_2(z)$ may comprise audio signals captured by two microphones, although this disclosure is not necessarily limited in this respect. The microphones, for example, may comprise omni-directional microphones (or other types of microphones) and may be included in device 20. The first signal $X_1(z)$ may be highly correlated with the second signal $X_2(z)$ due to close spatial proximity of the first and second microphones.

Pre-processing unit 22 performs pre-processing on second signal $X_2(z)$ to de-correlate second signal $X_2(z)$ from first signal $X_1(z)$ (82). The pre-processing may include applying adaptive filter 42 to the first signal $X_1(z)$ and subtracting the adaptively filtered first signal (output from adaptive filter 42) from the second signal $X_2(z)$. In addition, pre-processing the second signal $X_2(z)$ may further comprise generating a calibration factor "c" based on a ratio of noise floors of the first signal relative $X_1(z)$ to a difference $X'_2(z)$ between the second signal $X_2(z)$ and the adaptively filtered first signal (output of adaptive filter 42). In addition, the pre-processing may further comprise applying the calibration factor "c" to the difference $X'_2(z)$. In some cases, a delay may used such that pre-processing second signal $X_2(z)$ further comprises delaying second signal $X_2(z)$ prior to subtracting the adaptively filtered first signal (output from adaptive filter 42) from second signal $X_2(z)$. The delay element not shown in FIG. 2, but could be added if desired.

Next, BSS unit 24 performs a BSS technique on the first signal $X_1(z)$ and the pre-processed second signal $X''_2(z)$ (83). The BSS technique may include applying least mean square (LMS) adaptive filtering to the first signal $X_1(z)$, and summing the LMS adaptive filtered first signal (output of $W_{12}(z)$) with the pre-processed second signal $X''_2(Z)$. In addition, the BSS technique may include applying LMS adaptive filtering to the pre-processed second signal $X''_2(z)$, and summing the LMS adaptive filtered and pre-processed second signal (output of $W_{21}(z)$) with the first signal.

Finally, post processing unit 26 performs post processing to further de-correlate the first and second BSS signals, which are output by adders 32A and 32B respectively (84). In the case of FIG. 2, post-processing the first BSS signal (output of adder 32A) comprises applying a second adaptive filter 52 to the second BSS signal (output of adder 32B) and subtracting the adaptively filtered second BSS signal (output of adaptive filter 52) from the first BSS signal (output of adder 32A). Post processing the first BSS signal (output of adder 32A) may further includes delaying the first BSS signal via delay circuit 54 prior to subtracting the adaptively filtered second BSS signal (output from adaptive filter 52) from the first BSS signal such that the delayed output of circuit 54 is used by subtraction unit 56.

The output of device 20 may comprise signal $S'_1(z)$, which may comprise a very accurate representation of signal $X_1(z)$ with noise reduced. Alternatively, if post processing unit 26 of FIG. 2 is replaced with post processing unit 60 of FIG. 3, the output of device 70 may comprise signals $S''_1(z)$ and $S''_2(z)$.

A number of embodiments have been described. However, various modifications could be made to the techniques described herein. For example, the pre-and/or post-processing techniques described herein may be used with other BSS algorithms, which are not necessarily limited to those illustrated in FIG. 1. In addition, although the techniques have been primarily described for use in speech enhancement, such techniques may find broad application for any environment where BSS techniques are used including other audio signal applications, noise reduction, and bio-medical signal processing including electrocardiogram (ECG) and electroencephalogram (EEG) processing, and the like. For audio or speech processing the signals may be processed in real time for some applications.

The techniques described herein may be implemented in hardware, software, firmware, or any combination thereof. If implemented in software, the techniques may be directed to a computer readable medium comprising program code, that when executed cause a device to perform one or more of the techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the BSS enhancement techniques described herein. In some cases, the techniques may be executed by a DSP that invokes various hardware components to accelerate the process. In other cases, the units described herein may be implemented as a microprocessor, one or more application specific integrated circuits (ASICs), one or more field programmable gate arrays (FPGAs), one or more complex programmable logic device (CPLD), or some other hardware-software combination. The units described herein may be integrated into common hardware, circuit or processor. Specifically, the pre-processing units and post-processing units described in this disclosure could be implemented as one common unit with the BSS units described herein.

These and other embodiments are within the scope of the following claims.

The invention claimed is:

1. A device comprising:
   a first sensor that generates a first signal and a second sensor that generates a second signal;
   a pre-processing unit that pre-processes the second signal to de-correlate the second signal from the first signal, wherein the pre-processing unit is adapted to:
      apply a first adaptive filter to the first signal and subtracts the adaptively filtered first signal from the second signal,
      generate a calibration factor based on a ratio of noise floors of the first signal relative to a difference between the second signal and the adaptively filtered first signal, and
      apply the calibration factor to the difference; and
   a blind source separation (BSS) unit that applies a BSS technique to the first signal and the pre-processed second signal to generate first and second BSS signals respectively.

2. The device of claim 1, wherein the pre-processing unit applies an adaptive filter to the first signal and subtracts the adaptively filtered first signal from the second signal.

3. The device of claim 2, wherein the pre-processing unit generates a calibration factor based on a ratio of noise floors of the first signal relative to a difference between the second signal and the adaptively filtered first signal.

4. The device of claim 3, wherein the pre-processing unit applies the calibration factor to the difference.

5. The device of claim 2, wherein the pre-processing unit delays the second signal prior to subtracting the adaptively filtered first signal from the second signal.

6. The device of claim 1, further comprising a post-processing unit that post-processes the first BSS signal to further de-correlate the first BSS signal from the second BSS signal, and outputs the post-processed first BSS signal.

7. The device of claim 6, wherein the post-processing unit is adapted to apply a second adaptive filter to the second BSS signal and subtracts the adaptively filtered second BSS signal from the first BSS signal.

8. The device of claim 7, wherein the post-processing unit delays the first BSS signal prior to subtracting the adaptively filtered second BSS signal from the first BSS signal.

9. The device of claim 6, wherein the post-processing unit post-processes the first and second BSS signals to further de-correlate the first BSS signal from the second BSS signal.

10. The device of claim 1, wherein the BSS unit:
    applies least mean square (LMS) adaptive filtering the first signal;
    sums the LMS adaptive filtered first signal with the pre-processed second signal;
    applies LMS adaptive filtering to the pre-processed second signal; and
    sums the LMS adaptive filtered and pre-processed second signal with the first signal.

11. The device of claim 1, wherein the first sensor comprises a first microphone and the second sensor comprises a second microphone, and wherein the first signal comprises a first audio signal associated with the first microphone and the second signal comprises a second audio signal associated with the second microphone.

12. The device of claim 11, wherein the first audio signal is highly correlated with the second audio signal due to close spatial proximity of the first and second microphones.

13. The device of claim 1, wherein the device comprises a wireless communication device.

14. A non-transitory computer-readable medium comprising instructions stored therein that upon execution by a processor causes the processor to:
    receive a first signal and a second signal;
    pre-process the second signal to de-correlate the second signal from the first signal by:
       applying an adaptive filter to the first signal;
       applying a delay to the second signal;
       subtracting the adaptively filtered first signal from the delayed second signal;
       generating a calibration factor based on a ratio of noise floors of the first signal relative to a difference between the second signal and the adaptively filtered first signal, and
       applying the calibration factor to the difference; and
    apply a blind source separation (BSS) technique to the first signal and the pre-processed second signal to generate first and second BSS signals respectively.

15. The non-transitory computer-readable medium of claim 14, wherein the instructions to pre-process of the second signal includes instructions to cause the processor to:
    apply an adaptive filter to the first signal;
    subtract the adaptively filtered first signal from the second signal;
    generate a calibration factor based on a ratio of noise floors of the first signal relative to a difference between the second signal and the adaptively filtered first signal; and
    apply the calibration factor to the difference.

16. The computer-readable medium of claim 14, further comprising instructions to cause the processor to:
    post-process the first BSS signal to further de-correlate the first BSS signal from the second BSS signal.

17. The non-transitory computer-readable medium of claim 16, wherein the instructions to post-process of the first BSS signal includes instructions to cause the processor to:
    delay the first BSS signal;
    apply a second adaptive filter to the second BSS signal; and
    subtract the adaptively filtered second BSS signal from the delayed first BSS signal.

18. The non-transitory computer-readable medium of claim 14, wherein the first signal comprises a first audio signal associated with a first microphone and the second signal comprises a second audio signal associated with a second microphone.

19. A method operational in a device, comprising:
    obtaining a first signal associated with a first sensor and a second signal associated with a second sensor;
    pre-processing the second signal to de-correlate the second signal from the first signal by applying a first adaptive filter to the first signal and subtract the adaptively filtered first signal from the second signal,
       generating a calibration factor based on a ratio of noise floors of the first signal relative to a difference between the second signal and the adaptively filtered first signal, and
       applying the calibration factor to the difference; and
    applying a blind source separation (BSS) technique to the first signal and the pre-processed second signal to generate first and second BSS signals respectively.

20. The method of claim 19, further comprising:
    converting the first and second signals from analog signals into digital signals before the pre-processing of the second signal and where such pre-processing occurs before applying the blind source separation (BSS) technique.

21. The method of claim 19, further comprising:
post-processing the first BSS signal to further de-correlate the first BSS signal from the second BSS signal by:
applying a second adaptive filter to the second BSS signal and subtracting the adaptively filtered second BSS signal from the first BSS signal, and
delaying the first BSS signal prior to subtracting the adaptively filtered second BSS signal from the first BSS signal.

22. A non-transitory computer-readable medium comprising instructions stored therein that upon execution by a processor causes the processor to:
obtain a first signal associated with a first sensor and a second signal associated with a second sensor;
pre-process the second signal to de-correlate the second signal from the first signal by apply a first adaptive filter to the first signal and subtract the adaptively filtered first signal from the second signal,
generate a calibration factor based on a ratio of noise floors of the first signal relative to a difference between the second signal and the adaptively filtered first signal, and
apply the calibration factor to the difference; and
apply a blind source separation (BSS) technique to the first signal and the pre-processed second signal to generate first and second BSS signals respectively.

23. The non-transitory computer-readable medium of claim 22, further comprising instructions that upon execution by the processor causes the processor to:
convert the first and second signals from analog signals into digital signals before the pre-processing of the second signal and where such pre-processing occurs before applying the blind source separation (BSS) technique.

24. The non-transitory computer-readable medium of claim 22, further comprising instructions that upon execution by the processor causes the processor to:
post-process the first BSS signal to further de-correlate the first BSS signal from the second BSS signal by:
applying a second adaptive filter to the second BSS signal and subtracting the adaptively filtered second BSS signal from the first BSS signal, and
delaying the first BSS signal prior to subtracting the adaptively filtered second BSS signal from the first BSS signal.

25. A device comprising:
a first sensor that obtains a first signal and a second sensor that obtains a second signal;
a pre-processing unit that pre-processes the second signal to de-correlate the second signal from the first signal by applying an adaptive filter to the first signal;
applying a delay to the second signal;
subtracting the adaptively filtered first signal from the delayed second signal;
generating a calibration factor based on a ratio of noise floors of the first signal relative to a difference between the second signal and the adaptively filtered first signal, and
applying the calibration factor to the difference; and
a blind source separation (BSS) unit that applies a BSS technique to the first signal and the pre-processed second signal to generate first and second BSS signals respectively.

26. The device of claim 25, further comprising:
an analog-to-digital converter for converting the first and second signals from analog signals into digital signals before pre-processing of the second signal and where such pre-processing occurs before applying the BSS technique.

27. The device of claim 25, further comprising:
a post-processing unit that post-processes the first BSS signal to further de-correlate the first BSS signal from the second BSS signal by:
applying a second adaptive filter to the second BSS signal and subtracting the adaptively filtered second BSS signal from the first BSS signal, and
delaying the first BSS signal prior to subtracting the adaptively filtered second BSS signal from the first BSS signal.

28. The device of claim 25, wherein the device is a mobile wireless telephone and the first and second sensors are on different sides of the mobile wireless telephone.

29. A method operational in a device, comprising:
obtaining a first signal associated with a first sensor and a second signal associated with a second sensor;
pre-processing the second signal to de-correlate the second signal from the first signal by
applying an adaptive filter to the first signal;
applying a delay to the second signal;
subtracting the adaptively filtered first signal from the delayed second signal;
generating a calibration factor based on a ratio of noise floors of the first signal relative to a difference between the second signal and the adaptively filtered first signal, and
applying the calibration factor to the difference; and
applying a blind source separation (BSS) technique to the first signal and the pre-processed second signal to generate first and second BSS signals respectively.

30. The method of claim 29, further comprising:
converting the first and second signals from analog signals into digital signals before pre- processing of the second signal and where such pre-processing occurs before applying the blind source separation (BSS) technique.

31. The method of claim 29, further comprising:
post-processing the first BSS signal to further de-correlate the first BSS signal from the second BSS signal by:
applying a second adaptive filter to the second BSS signal and subtracting the adaptively filtered second BSS signal from the first BSS signal, and
delaying the first BSS signal prior to subtracting the adaptively filtered second BSS signal from the first BSS signal.

32. A device comprising:
means for obtaining a first signal associated with a first sensor and a second signal associated with a second sensor;
means for pre-processing the second signal to de-correlate the second signal from the first signal by
applying a first adaptive filter to the first signal and subtract the adaptively filtered first signal from the second signal,
generating a calibration factor based on a ratio of noise floors of the first signal relative to a difference between the second signal and the adaptively filtered first signal, and
applying the calibration factor to the difference; and
means for applying a blind source separation (BSS) technique to the first signal and the pre-processed second signal to generate first and second BSS signals respectively.

33. A device comprising:
means for obtaining a first signal associated with a first sensor and a second signal associated with a second sensor;
means for pre-processing the second signal to de-correlate the second signal from the first signal by
   applying an adaptive filter to the first signal;
   applying a delay to the second signal;
   subtracting the adaptively filtered first signal from the delayed second signal;
   generating a calibration factor based on a ratio of noise floors of the first signal relative to a difference between the second signal and the adaptively filtered first signal, and
   applying the calibration factor to the difference; and
means for applying a blind source separation (BSS) technique to the first signal and the pre-processed second signal to generate first and second BSS signals respectively.

* * * * *